(12) United States Patent
Fake et al.

(10) Patent No.: US 8,738,767 B2
(45) Date of Patent: May 27, 2014

(54) MAINFRAME MANAGEMENT CONSOLE MONITORING

(75) Inventors: Robert Fake, Clifton, VA (US); Deborah Gannaway, Tampa, FL (US)

(73) Assignee: MEAS, LLC, Tampa, FL (US)

( * ) Notice: Subject to any disclaimer, the term of this patent is extended or adjusted under 35 U.S.C. 154(b) by 250 days.

(21) Appl. No.: 13/437,624

(22) Filed: Apr. 2, 2012

(65) Prior Publication Data

US 2012/0254337 A1 Oct. 4, 2012

Related U.S. Application Data

(60) Provisional application No. 61/470,328, filed on Mar. 31, 2011.

(51) Int. Cl.
- *G06F 15/173* (2006.01)
- *H04L 12/24* (2006.01)
- *H04L 12/26* (2006.01)
- *H04L 12/56* (2006.01)

(52) U.S. Cl.
CPC ............ *H04L 41/06* (2013.01); *H04L 41/0686* (2013.01); *H04L 43/04* (2013.01); *H04L 43/06* (2013.01); *H04L 45/00* (2013.01)

USPC ............ 709/224; 709/203; 709/238; 709/246

(58) Field of Classification Search
USPC ........................................ 709/224, 238, 246
See application file for complete search history.

(56) References Cited

U.S. PATENT DOCUMENTS

| | | | |
|---|---|---|---|
| 7,526,452 B2 * | 4/2009 | Agarwal et al. | 705/52 |
| 7,642,504 B2 * | 1/2010 | Abrate et al. | 250/227.14 |
| 8,108,550 B2 * | 1/2012 | Lahoti et al. | 709/238 |
| 8,402,540 B2 * | 3/2013 | Kapoor et al. | 726/23 |
| 8,458,519 B2 * | 6/2013 | McCune et al. | 714/25 |

* cited by examiner

*Primary Examiner* — Michael Y Won
(74) *Attorney, Agent, or Firm* — Holland & Hart LLP

(57) ABSTRACT

Methods, systems, and devices are described for monitoring and managing mainframe events. In the methods, systems, and devices of the present disclosure, a stream of messages at a mainframe management console may be monitored to detect mainframe events. The mainframe events may be filtered according to at least one predetermined filtering criterion to identify a plurality of selected mainframe events. The selected mainframe events may then be converted from a character encoding specific to the mainframe to a generic character encoding, and routed to at least one destination Security Information Event Manager (SIEM) application.

17 Claims, 11 Drawing Sheets

MAINFRAME MANAGEMENT CONSOLE MONITORING

CROSS REFERENCES

The present application claims priority to U.S. Provisional Patent Application No. 61/470,328, entitled "MAINFRAME MANAGEMENT CONSOLE MONITORING," filed on Mar. 31, 2011, the entire disclosure of which is incorporated herein by reference in its entirety for all purposes. The present application is related to U.S. patent application Ser. No. 13/437,631 filed concurrently herewith, entitled "MULTIPLE DESTINATIONS FOR MAINFRAME EVENT MONITORING," and U.S. patent application Ser. No. 13/437,636 filed concurrently herewith, entitled "MAINFRAME EVENT CORRELATION," each of which is incorporated by reference in its entirety for all purposes.

BACKGROUND

The present invention relates to mainframe event and message processing in general and, in particular, to the creation and monitoring of records related thereto. Mainframes, in the course of operation, create and monitor a variety of events and other messages (e.g., syslog messages), which contain various information regarding mainframe operations. These records may be analyzed for a variety of purposes. A mainframe may assign specific codes to the event or other messages depending on the triggering circumstance, and also may provide access to the stored records.

The information contained within the mainframe event records may be valuable to third party applications. For example, by analyzing event record codes and event information, third parties may be able to identify various conditions and processing incidents on and recorded by the mainframe. This event record information may disclose a security violation detected on the mainframe system, a mainframe memory issue, an application error, or a variety of other mainframe operations and processing incidents.

In many instances, the high number, variety, and frequency of events recorded on the mainframe make it difficult for third parties to use this information efficiently. Also, the information contained in an event record is in a mainframe specific character encoding (e.g., EBCDIC). Finally, third parties seeking to use event record information are confronted with challenges in interfacing with the mainframe because of the complexity and security.

SUMMARY

Methods, systems, and devices are described for mainframe event monitoring and management.

In a first set of embodiments, a method for managing mainframe events may include monitoring a stream of messages at a mainframe management console to detect mainframe events, filtering the mainframe events according to at least one predetermined criterion to identify a plurality of selected mainframe events, converting each selected mainframe event from a character encoding specific to the mainframe to a generic character encoding, and routing the selected mainframe events to at least one destination Security Information Event Manager (SIEM) application.

In a second set of embodiments, a system for managing mainframe events may include a filter module, a re-encoding module, and a routing module. The filtering module may be configured to monitor a stream of messages at a mainframe management console to detect mainframe events and filter the mainframe events according to at least one predetermined criterion to identify a plurality of selected mainframe events. The re-encoding module may be configured to convert each selected mainframe event from a character encoding specific to the mainframe to a generic character encoding. The routing module may be configured to route the selected mainframe events to at least one destination Security Information Event Manager (STEM) application.

In a third set of embodiments, a system for managing mainframe events may include at least one processor and at least one memory communicatively coupled with the at least one processor. The at least one memory may include executable code that, when executed by the at least one processor, causes the at least one processor to: monitor a stream of messages at a mainframe management console to detect mainframe events, filter the mainframe events according to at least one predetermined criterion to identify a plurality of selected mainframe events, convert each selected mainframe event from a character encoding specific to the mainframe to a generic character encoding, and route the selected mainframe events to at least one destination Security Information Event Manager (SIEM) application.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
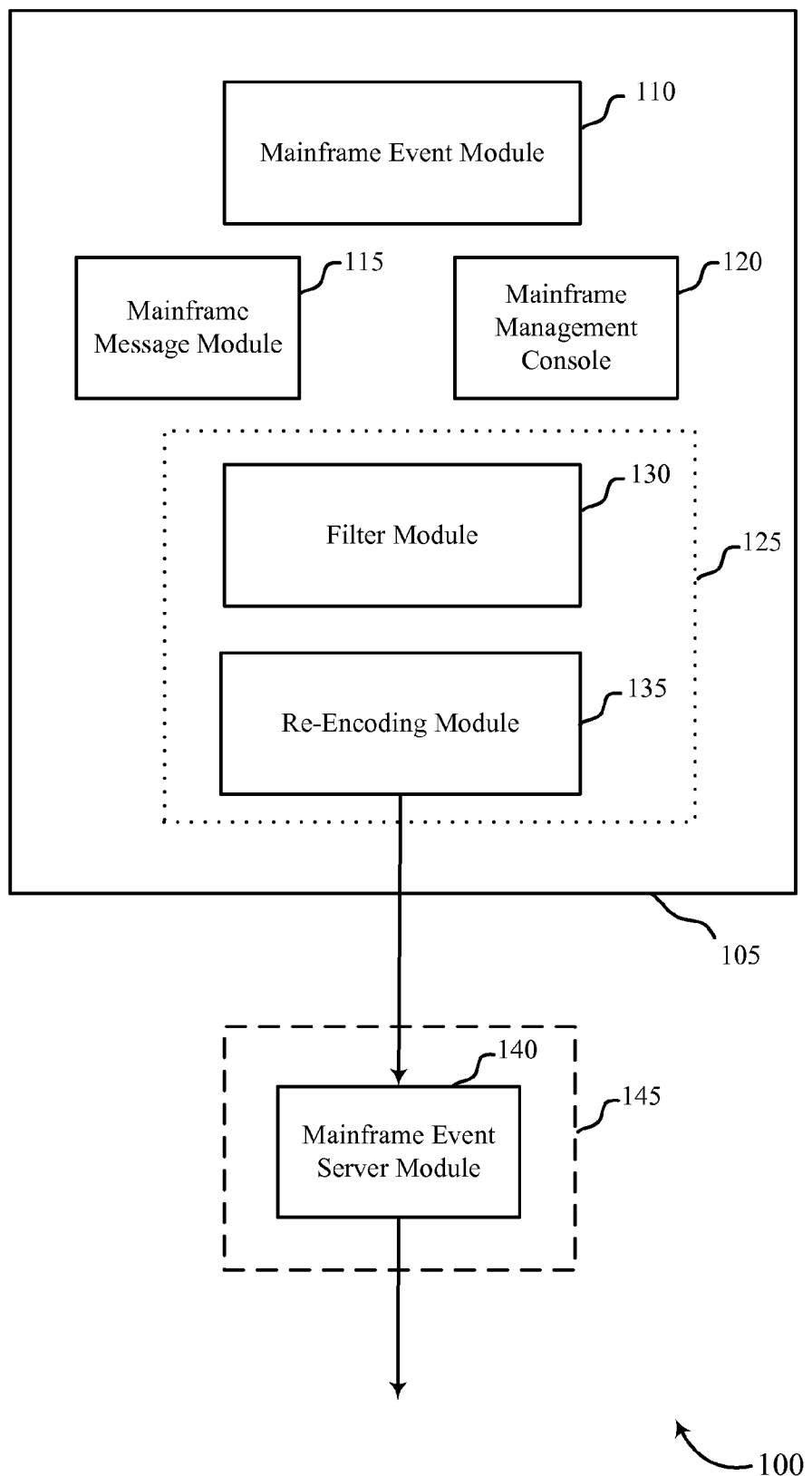
FIG. 1 is a block diagram of an example system including components configured according to various embodiments of the invention.

Methods, systems, and devices are described for monitoring and managing mainframe events. In the methods, systems, and devices of the present disclosure, mainframe events may be detected, filtered according to type or content, and converted to a generic character encoding in preparation for routing to one or more destination Security Information and Event Management (SIEM) applications. In this way, mainframe events may be integrated with events from other sources in one or more SIEM applications, allowing an administrator to receive a consolidated view of all system events through a single SIEM application.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of the present disclosure and appended claims, the term "mainframe" refers broadly to a computer system capable of supporting a substantial number (hundreds, thousands, or more) of substantially simultaneous applications and/or users.

For purposes of the present disclosure and appended claims, the term "event" refers broadly to a logged occurrence of an action within an operating system or computer program environment.

For purposes of the present disclosure and appended claims, the term "message" refers broadly to a logged record. A message may be directed to a recipient, or simply a portion of a stored record or log.

For purposes of the present disclosure and appended claims, the term "mainframe console" or "mainframe management console" refers broadly to a command-line interface of a mainframe operating system.

For purposes of the present disclosure and appended claims, the term "Security Information and Event Management (SIEM) application" refers broadly to a computer program configured to provide real-time analysis of security issues in a system based on messages or events received from one or more computer systems in a network. As used herein, the term SIEM application generically refers to both Security Information Management (SIM) applications and Security Event Management (SEM) applications. For purposes of the present disclosure, the terms "SIEM application," "SIM application," and "SEM application" are synonymous and interchangeable.

For purposes of the present disclosure and appended claims, the term "mainframe event server module" refers to a hardware implemented module that receives mainframe events associated with a mainframe and distribute those events to one or more third party SIEM applications.

Systems, devices, methods, and software are described for a mainframe event and message processing system 100. In one set of embodiments, shown in FIG. 1, a system 100 includes a mainframe 105 and a mainframe event server module 140. These components may be in communication with each other, directly or indirectly (e.g., via a network). While the illustrated example shows the mainframe event server module 140 residing on server computer system 145 independent from the mainframe 105, in other embodiments the mainframe event server module 140 may be integrated in varying degrees with the mainframe 105.

Components on the mainframe 105 include a mainframe event module 110, a mainframe message module 115, a mainframe management console 120, an event/message filter module 130, and a re-encoding module 135. A mainframe 105 is a high-level system designed for more computationally intensive jobs, and is often utilized by large organizations for managing and executing a variety of complex computer systems and applications. Unlike typical home and business computers, mainframes are designed to handle very high volume input and output with increased computing throughput. Like a typical computer, the mainframe 105 runs an operating system (e.g., IBM's z/OS) that provides functionality including starting and stopping applications, managing memory allocation and access, and reporting a variety of system events.

The mainframe event module 110 may detect, generate, process and/or store events of the mainframe operating system. The events may be system management facility (SMF) events, or be any number of other types of events. The mainframe event module 110 may be integrated in whole or in part with the mainframe 105 operating system, be a separate and distinct control unit on the mainframe 105, or be program or application running on the mainframe 105 operating system. The mainframe event module 110 may process system events reported and forwarded by the operating system and other mainframe systems. The mainframe event module 110 may generate and/or receive the event. During operation, the mainframe 105 operating system may report a variety of mainframe system events indicating various states, actions or system failures, such as a failure to start or complete an action, or a report of unauthorized access of a file on the mainframe 105. These events may be collected by the mainframe event module 110 for storage in an event record database (not specifically shown, although it may be part of mainframe event module 110-a). The mainframe event module 110-a may include a number of sub-modules (e.g., separate sub-modules for system, application, and security), and include a number of different event record databases.

To differentiate the various events reported by the mainframe, unique event codes may be assigned to records of different types mainframe events. Type 80, Type 101 and Type 102 are examples of codes of different "types" of events, and there may be codes for "sub-types" as well. As noted above, in one embodiment the events are SMF events. The SMF events may include DB2, customer information control system (CICS), Resource Access Control Facility (RACF), and other password violation and denied resource access attempt-related events as well as those generated by any application running on the mainframe 105.

As noted, the mainframe event module 110 may include an event record database, or they may be distinct components of the mainframe 105. For example, the mainframe event module 110 may collect events reported by the mainframe and forward the events to a mainframe event record database. The IBM z/OS System Management Facility interface is one example of such a mainframe event module 110.

The mainframe message module 115 may receive, process, generate, and store messages and records related to mainframe events. The mainframe message module 115 may be integrated to varying degrees with the mainframe operating system, be a separate and distinct control unit on the mainframe 105, or be a program or application running on the mainframe 105 operating system. The mainframe message module 115 may process messages reported and forwarded by the mainframe 105 operating system, including the mainframe event module 110, or various programs or applications running thereon or related thereto. During operation, components, programs, or applications associated with the operating system may generate or trigger the generation of a range of informational messages. These messages may be reported to the mainframe message module 110, or may trigger the mainframe message module 110 to generate such messages.

These messages may include, for example, syslog messages directed to a mainframe management console 120. Syslog is an open standard that may be used for system management and security auditing, as well as generalized informational, analysis, and debugging messages. It is supported by a wide variety of devices and programs across multiple platforms. Because of this, syslog may be used to integrate log data from many different types of systems into a central repository, such as the mainframe management console 120.

In additional or alternative examples, these messages may be messages or other information from a database server or manager (e.g., an Information Management System (IMS), or IBM DB2) or a transaction server (e.g., a customer information control system (CICS) or application programs developed or purchased by a customer). The respective servers and sources of information may be on or off the mainframe 105. To differentiate the various messages, unique message codes may be assigned to different types of messages. There may be a variety of formats for different messages (e.g., in one example, the first part of the message code may identify the application, and the second part of the code may identify the message type).

The filter module 130 may directly or indirectly monitor the mainframe event module 110-a and mainframe message module 110-b for messages or events matching one or more criteria (e.g., monitoring for identifiers or other types of codes associated with event types or message types). The filter module 130 may be a software process that runs on the mainframe 105. The filter module 130 may copy or otherwise retain message data associated with the specified mainframe event or message types, and route them to the re-encoding module 135. An administrator may specify the types of events and/or messages trapped (e.g., using a web-based graphical user interface (GUI) or input parameters). An administrator may modify the filter criteria dynamically (e.g., without rebooting the mainframe 105). The criteria may change based on the time of day, day of the week, identity of the user, etc.

Thus, in one embodiment, the filter module 130 may monitor the codes of the various event-related messages being transmitted to or from mainframe event module 110-a and/or mainframe message module 110-b, and copy a relevant subset of messages matching certain criteria to identify a plurality of selected mainframe events. The re-encoding module 135 may receive the events and/or messages from the filter module 130. The re-encoding module 135 may be a software process that runs on the mainframe 105 operating system. The re-encoding module 135 may re-encode the events and/or messages from a character encoding specific to the mainframe (e.g., Extended Binary Coded Decimal Information Code (EBCDIC)) into a common machine readable character encoding (e.g., American Standard Code for Information Interchange (ASCII)). Most modern character-encoding schemes are based on ASCII, and proprietary mainframe formats are not commonly used outside of a mainframe environment by non-mainframe systems and third party applications. The re-encoding module 135 may perform other types of re-encoding or reformatting, as well. In other embodiments, the re-encoding module 135 need not be used (e.g., if a message was already formatted in ASCII). It is worth noting that while the filter module 130 and re-encoding module 135 are depicted as residing as a unit 125 of the mainframe 105, any part of these modules or their functionality may be located off the mainframe (e.g., at server computer system 145).

The re-encoded event or message from re-encoding module 135 may then be forwarded to the mainframe event server module 140. The re-encoding module 135 may group a number of messages for transmission together (e.g., at a user defined interval). The mainframe event server module 140, upon receiving a mainframe event or message, may process the raw, re-encoded event or message (e.g., in ASCII), and generate a translated version of that data in open data standard format (e.g., the common event format (CEF)). The mainframe event server module 140 may route and transmit the open data standard format event or message record to any number of different destinations. The mainframe event server module may be running on Windows, UNIX, LINUX, or other operating systems. In certain examples, the mainframe event server module 140 may be implemented in Java to allow for greater platform independence. However, other programming languages and platforms may be used in other examples (e.g., Python, Ruby, Scala, or Clojure).

The server computer system 145 hosting the mainframe event server module 140 performing the conversion, routing, and transmission may be fully located within a single facility or distributed geographically, in which case a network may be used to integrate different components. Although the illustrated embodiment shows that a server computer system 145 hosting the mainframe event server module 140 performs the conversion, in other examples these functions may be performed by the mainframe 105 or a virtual server.

Event and message data, in various forms, may be stored in one or more data stores on mainframe 105 and server computer system 145. A data store may be a single database, or may be made up of any number of separate and distinct databases. The data store may include one, or more, relational databases or components of relational databases (e.g., tables), object databases, or components of object databases, spreadsheets, text files, internal software lists, or any other type of data structure suitable for storing data. Thus, it should be appreciated that a data store may each be multiple data storages (of the same or different type), or may share a common data storage with other data stores. In some embodiments the data store may be distinct from the mainframe 105 and the server computer system 145, while in other embodiments it may be integrated therein to varying degrees.

The components of the system 100 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 2:
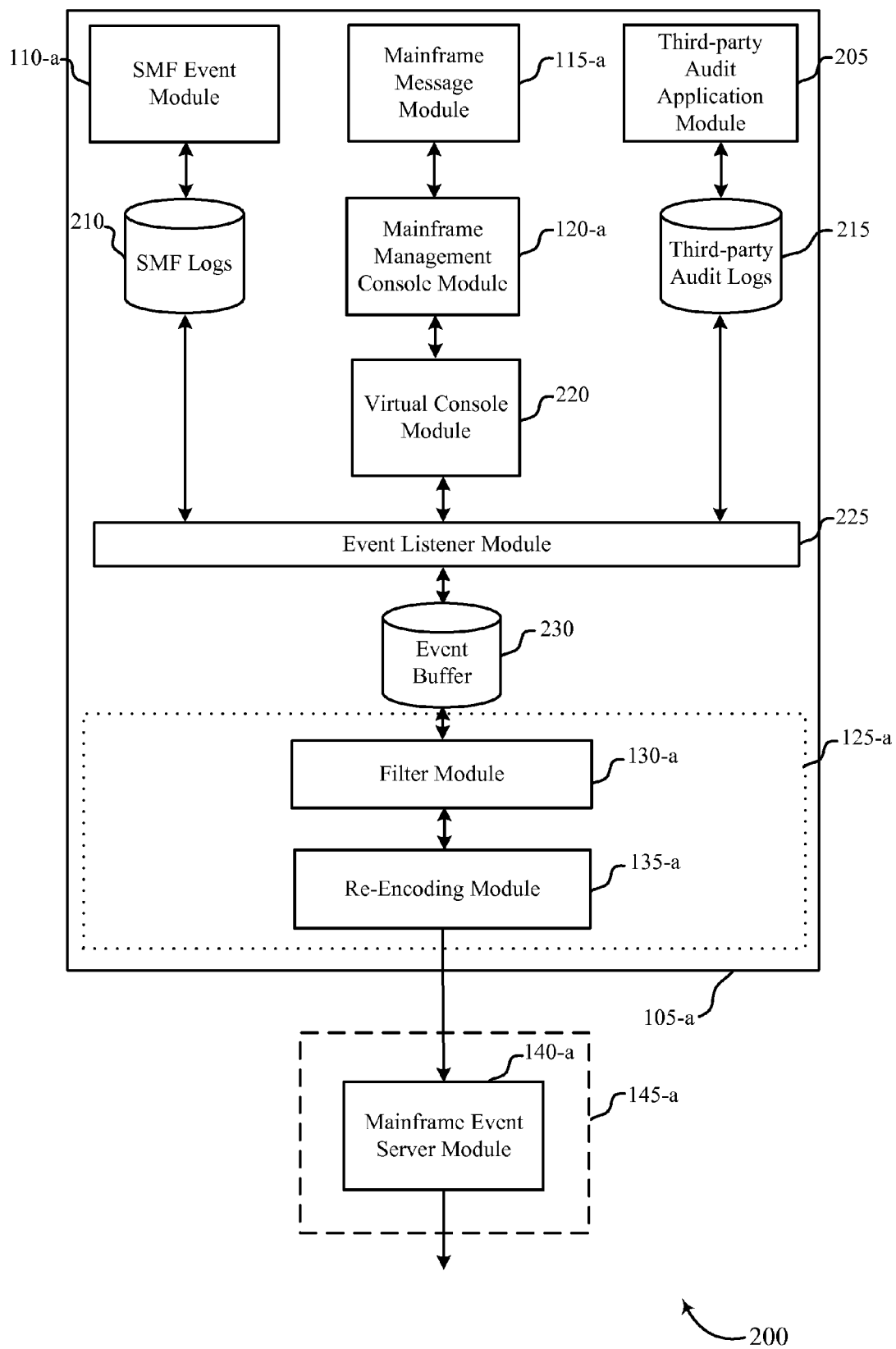
FIG. 2 is a block diagram of an example system including components configured according to various embodiments of the invention.

FIG. 2 is a block diagram of another example system 200 for monitoring and management. The system 200 includes a mainframe 105-a and a mainframe event server module 140-a. These components may be in communication with each other, directly or indirectly (e.g., via a network). The system 200 may be an example of the system 100 described above with reference to FIG. 1. While the illustrated example shows the mainframe event server module 140 residing on server computer system 145 independent from the mainframe 105, in other embodiments the mainframe event server module 140 may be integrated in varying degrees with the mainframe 105.

In the present example, the mainframe 105-a includes a mainframe SMF event module 110-a, an SMF log data store 210, a mainframe message module 115-a, a mainframe management console module 120-a, a virtual console module 220, a third-party security audit application module 205, a third-party security audit log data store*215, an event listener module 225, an event buffer data store 230, a filter module 130-a, and a re-encoding module 135-a. Each of these components may be in communication, directly or indirectly. The mainframe SMF event module 110-a may be an example of the mainframe event module 110 described above with reference to FIG. 1. Similarly, the mainframe message module 115-a and mainframe management console module 120-a may be examples of the mainframe message module 115 and mainframe management console module 120 described above with reference to FIG. 1. The filter module 130-a and re-encoding module 135-a may be examples of the filter module 130 and re-encoding module 135 described above with reference to FIG. 1.

The SMF event module 110-a may detect and generate SMF events, which are recorded as log messages in the SMF log data store 210. The mainframe message module 115-a may detect and direct system messages to the mainframe management console module 120-a, which allows an administrator to view the messages. Some or all of these messages may also be mirrored and copied to the virtual console module 220 for use in detecting events without disturbing the flow of the mainframe management console module 120-a.

The third-party security audit application module 205 may monitor and log certain actions and events taken at the mainframe 105-a that are not recorded by the SMF event module 110-a or the mainframe message module 115-a. In one example, the third-party security audit application module 205 may run a CA TOP SECRET application to monitor the types of security administrative commands issued by a system administrator and other actions that are not monitored by the SMF event module 110-a or the mainframe management console module 120-a. The TOP SECRET application may be periodically invoked to produce a new audit file on a regular basis, and each audit file may be stored at the third-party security audit log data store 215. Additional or alternatively, any other suitable type of mainframe security audit application may be invoked at the third-party security audit application module 205 to produce audit logs for the third-party security audit log data store 215.

The event listener module 225 may communicate with the SMF logs data store 210, the virtual console module 220, and the third-party security audit log data store 215 to identify mainframe events. These mainframe events may be copied and consolidated in the event buffer data store 230. In certain examples, the event listener module 225 may convert one or more records in the SMF logs data store 210, the virtual console module 220, or the third-party security audit log data store 215 such that all of the events written to the event buffer data store 230 are in the same format. As a large number of mainframe events may occur in a short amount of time, the event buffer data store 230 may have the capability of storing records corresponding to millions of mainframe events or more.

The filter module 130-a may filter the mainframe events in the event buffer data store 230 to select mainframe events according to one or more filtering criteria input by an administrator. The filtering criteria may be as granular or generic as may suit the specifications of a particular administrator or mainframe 105-a. In one example, the filtering criteria may select all events in the event buffer data store 230 having a specific code. Additionally or alternatively, the filtering criteria may select all events in the event buffer data store 230 that begin with or contain a certain string of letters. The filtering criteria may be static, or may be dynamically changed over time. In certain examples, the filtering criteria may be dynamically updated in real-time by an administrator. Additionally or alternatively, the filtering criteria may automatically change based on time of day, mainframe usage, the type or number of applications or clients associated with the mainframe at a given time, and/or any other criteria that may suit a particular application of the principles described in the present disclosure.

The re-encoding module 135-a may convert the events selected by the filter module 130-a from a character encoding associated with the mainframe (e.g., EBCDIC) to a generic character encoding (e.g., ASCII). In certain examples, the re-encoding module 135-a may perform the first of a series of re-encoding and reformatting steps that are performed on the selected events. For instance, the re-encoding module 135-a may convert the selected events from EBCDIC to ASCII, and the mainframe event server module 140-a may convert all of the selected events to the common event format (CEF). In certain examples, the mainframe event server module 140-a may further convert one or more of the selected events to a format compatible with a destination SIEM application. Once the selected events have undergone all appropriate re-encoding and reformatting, the mainframe event server module 140-a may route the selected events to one or more selected destination SIEM applications (not shown). The SIEM application(s) may be running on the mainframe 105-a or on another device in communication with the mainframe 105-a and/or the mainframe event server module 140-a.

Figure 3:
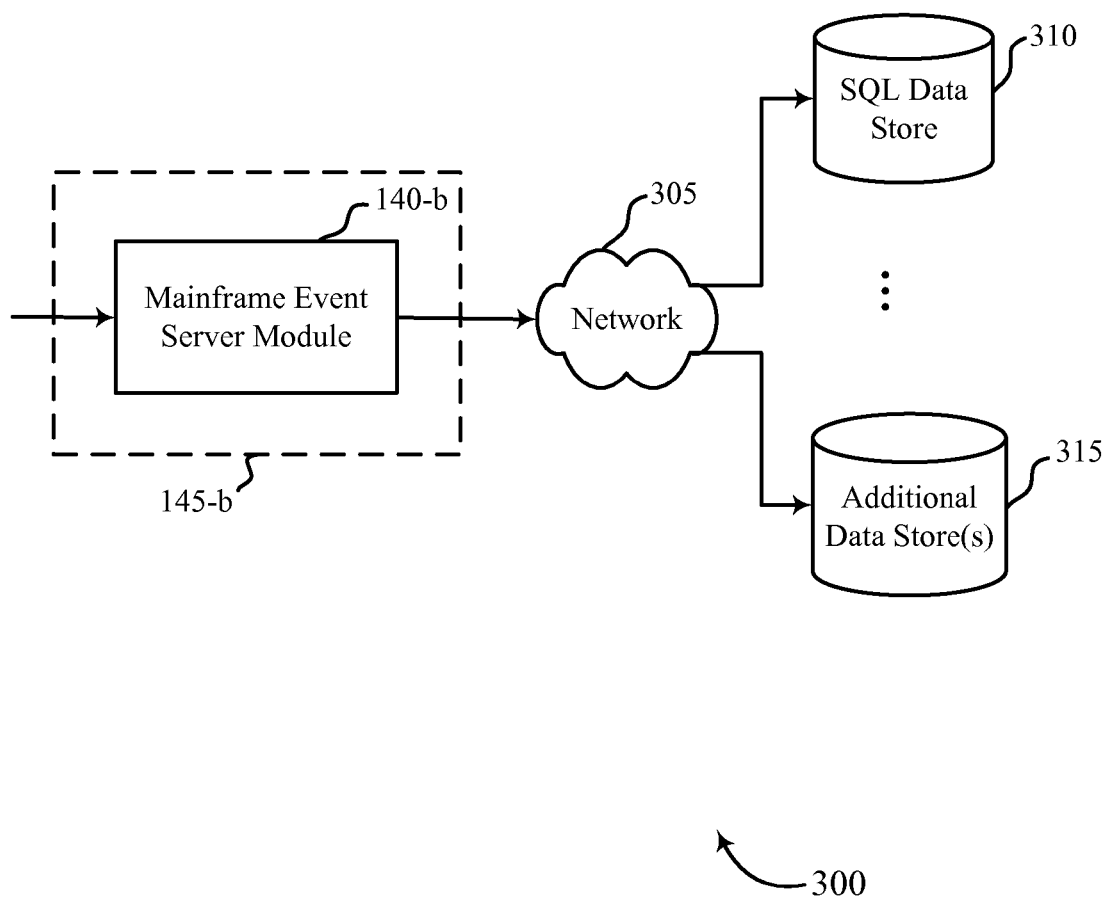
FIG. 3 is a block diagram of an example system including components configured according to various embodiments of the invention.

FIG. 3 is a block diagram of a system 300 for event and message processing. The system 300 of the present example may include a number of aspects of the system 100 described with reference to FIG. 1 or the system 200 described with reference to FIG. 2, each of which illustrates an example of the mainframe event and message processing system. The system 300 of FIG. 3 includes a mainframe event server module 140-b operating on a server computer system 145-a, a network 305, SQL data store 310, and one or more additional data stores 315. The mainframe event server module 140-b may receive an event or message from a mainframe (e.g., the raw data from a re-encoded event or message in ASCII described with reference to the mainframe 105 of FIG. 1 or FIG. 2). The mainframe event server module 140-b may generate a translated version of that event or message data in open data standard format (e.g., the common event format (CEF)).

The mainframe event server module 140-b may also determine destinations for the data based on user input or other rules. The destinations may include any number of different security information management (SIM) or security event management (SEM) applications (hosted or otherwise), which are collectively characterized as SIEM applications in the present disclosure. By way of example, such SIEM applications may include applications from ARCSIGHT, NITROSECURITY, and MCAFEE. The mainframe event server module 140-b may reformat one or more events or message in open data standard format (e.g., CEF), changing the event or message into a proprietary format associated with a selected SIEM application. The reformatted event/message data may be routed to an additional data store 315 associated with the selected SIEM application. In addition, or alternatively, the destination may be an SQL data store 310. The mainframe event server module 140-B may reformat the event or message in the open data standard format (e.g., CEF), changing the event or message into a format for storage on SQL data store 310.

Thus, the mainframe event server module 140-b may receive an event or message in ASCII, and may translate that data to an open data standard format. The mainframe event server module 140-b may determine a destination for the event or message (e.g., an SQL data store 310, or a proprietary SIEM application). If the destination needs to receive data in a certain format, the mainframe event server module 140-b may reformat the data (e.g., into a format associated with the SIEM application, or the SQL database). In some embodiments, the destination may use the open data standard format, in which case the data may be forwarded in the open data standard format.

Figure 4:
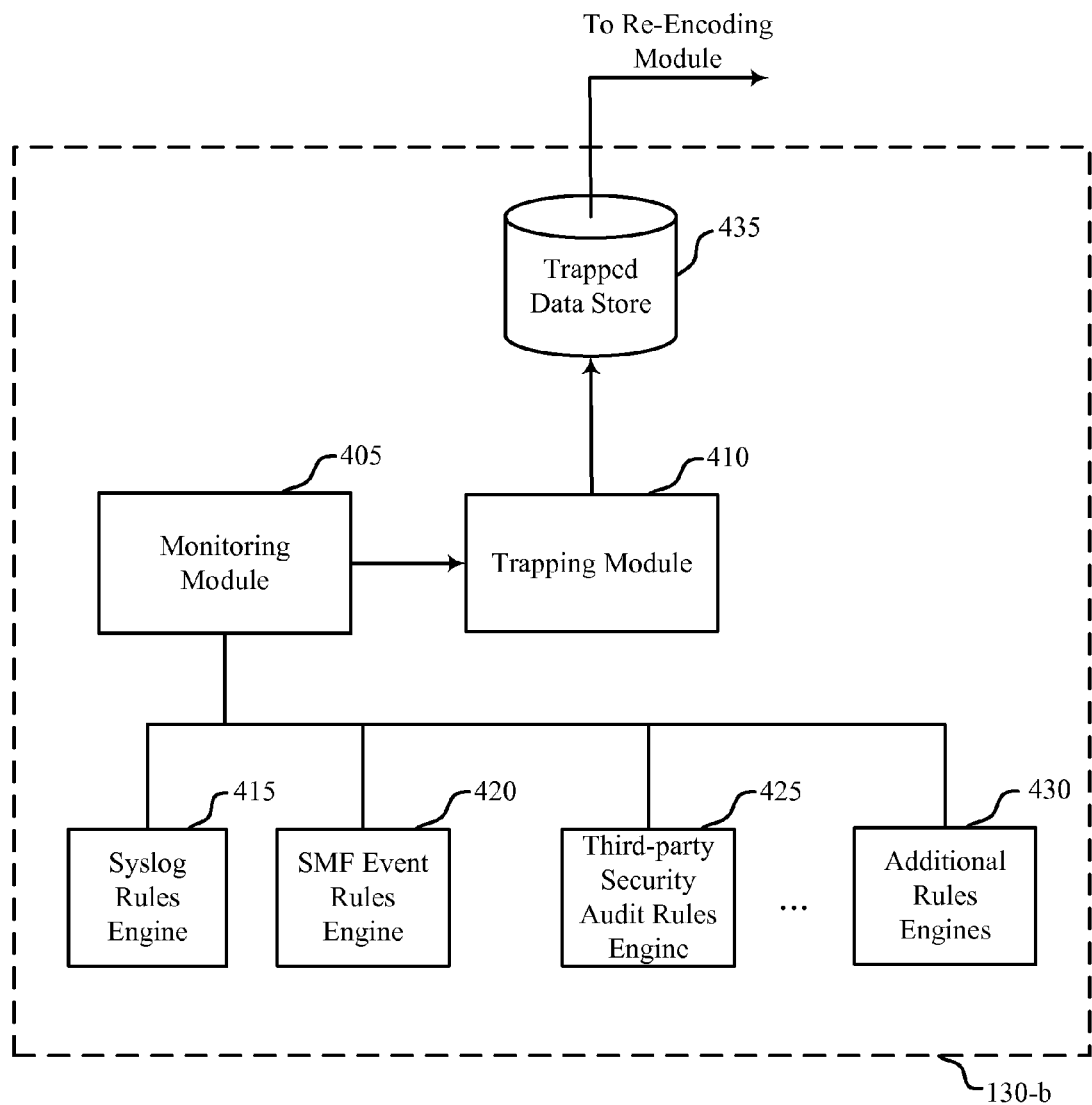
FIG. 4 is a block diagram of an example filter module including components configured according to various embodiments of the invention.

FIG. 4 is a functional block diagram 400 illustrating one embodiment of a filter module 130-b. The filter module 130-b of FIG. 4 may be an example of the filter module 130 described with reference to FIG. 1. filter module 130-b includes monitoring module 405, trapping module 410, Syslog rules engine 415, an SMF event rules engine 420, third-party audit file rules engine 425, additional rules engines 430, and trapped data store 435. These components may be integrated into a mainframe (e.g., mainframe 105 of FIG. 1), or portions of the functionality may be located on a server computer system off of a mainframe (e.g., server computer system 145 of FIG. 1).

The monitoring module 405 may monitor events detected by an event listener module (e.g., event listener module 225 of FIG. 2) as they are logged at an event buffer data store (e.g., event buffer data store 230 of FIG. 2). The events may be in EBCDIC or ASCII formats. The monitoring module 405 may monitor for specific types and/or sub-types of events (e.g., by matching codes of interest with the codes of events that have actually occurred, or otherwise listening for certain event codes). The monitoring may be according to the filtering criteria set by an administrator or other user. These filtering criteria may be defined by the rules engines 415, 420, 425, 430. In the present example, a Syslog rules engine 415 identifies events derived from syslog messages that are to be selected (e.g., based on syslog message codes) according to a first set of rules, an SMF event rules engine 420 identifies types and sub-types of SMF events that are to be selected (e.g., based on codes and/or content) according to a second set of rules, a third-party security audit file rules engine 425 that identifies events derived from third-party security application audit files that are to be selected according to a third set of rules. There may be additional rules engines 430 in communication with the monitoring module 405 identifying other types of events that should be trapped.

Thus, the monitoring module 405 analyzes the various mainframe events and messages, and identifies events and messages of interest according to criteria identified by the rules engines 415, 420, 425, 430. When an event or message of interest is identified and selected by the monitoring module 405, the monitoring module 405 may communicate with the trapping module 410 to copy or otherwise retain all or part of the event or message. The trapping module 410 may store all or part of the event or message in the trapped data store 435. The events or messages may be forwarded, individually or in groups, from the trapped data store 435. These messages may then be forwarded for reformatting (e.g., from EBCDIC to ASCII, and/or into an open data standard format, and/or into a format for an SQL database and/or SIM/SEM application, and/or another type of data store).

Figure 5:
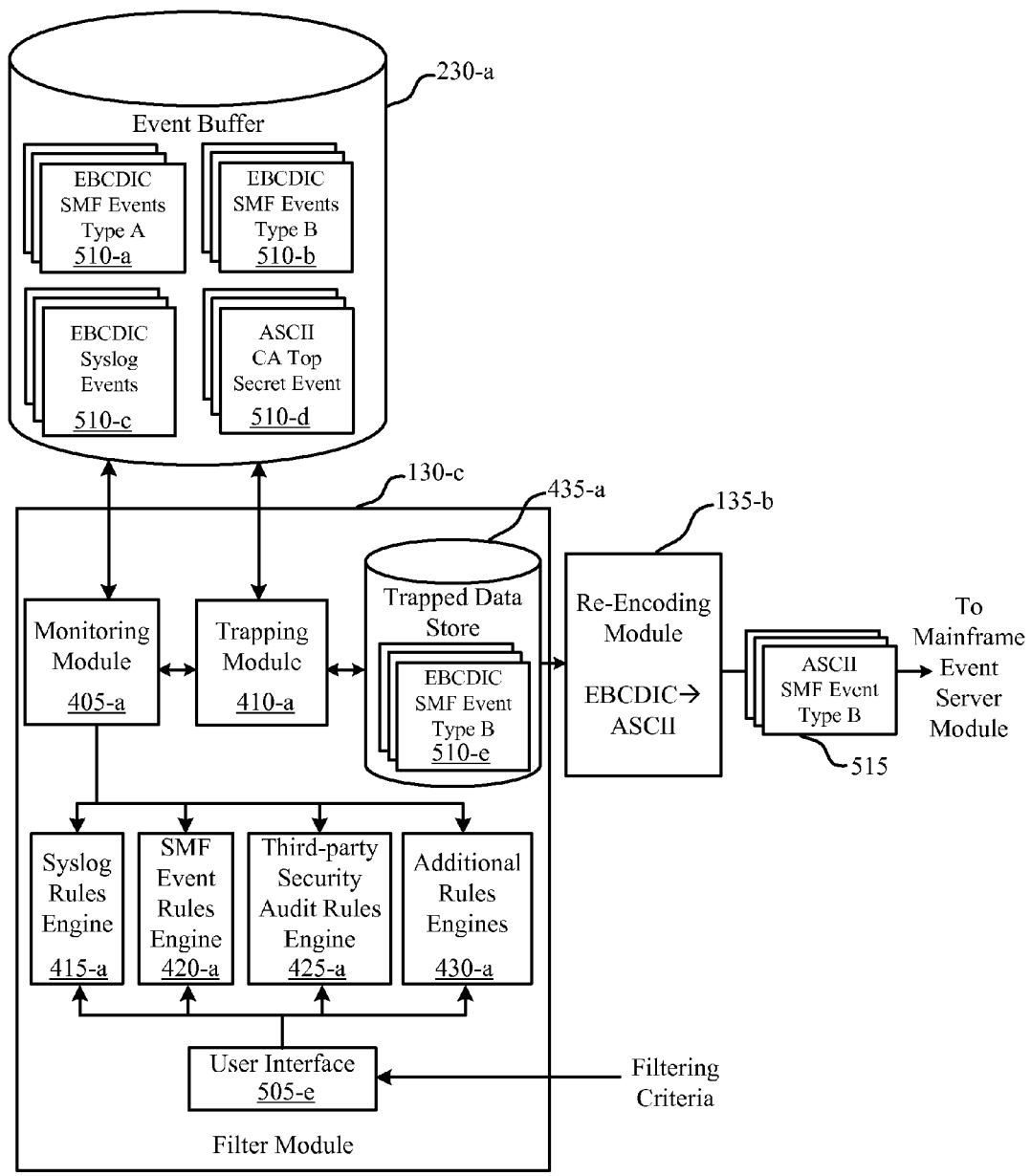
FIG. 5 is a block diagram of an example system including components configured according to various embodiments of the invention.

FIG. 5 is a functional block diagram 500 illustrating one example of an event buffer data store 230-a, a filter module 130-c, and a re-encoding module 135-b of a mainframe (e.g., mainframe 105 of FIG. 1 or FIG. 2). The filter module 130-c of FIG. 5 may be an example of the filter module 130 described with reference to FIG. 1 or FIG. 4. filter module 130-C includes monitoring module 405-a, trapping module 410-a, Syslog rules engine 415-a, an SMF event rules engine 420-a, third-party audit file rules engine 425-a, additional rules engines 430-a, trapped data store 435-a, and user interface 505. These components may be integrated into the mainframe, or portions of the functionality may be located on a server computer system off of a mainframe (e.g., server computer system 145 of FIG. 1 or FIG. 2).

In the example of FIG. 5, an event buffer data store 230-a may store a first type of EBCDIC SMF events 510-a, a second type of EBCDIC SMF events 510-b, EBCDIC syslog type events 510-c, and ASCII CA TOP SECRET events 510-d. The filter module 130-c may receive filtering criteria from an administrative user at user interface 505. In a simple example, the filtering criteria of the present example may instruct the filter module 130-c to trap and forward all EBCDIC SMF events 510-b of the second type. The filtering criteria may be used to update the SMF event rules engine 420-a, which affects the types of events 510 that the monitoring module 405 watches for at the event buffer data store 230-a.

For each event 510 stored in the event buffer data store 230-a that matches the filtering criteria, the monitoring module 405-a may instruct the trapping module 410-a to copy that event to the trapped data store 435-a. Thus, according to the example of FIG. 5, the trapped data store 435-a may store a copies 510-e of each of the EBCDIC SMF events 510-b of the second type found in the event buffer data store 230-a. The trapped event copies 510-e may be forwarded to the re-encoding module 135-b for conversion from EBCDIC to ASCII. Accordingly, in the present example the re-encoding module 135-b may output ASCII SMF events 515-a of the second type to the mainframe event server module (e.g., mainframe event server module 140 of FIG. 1, FIG. 2, or FIG. 3).

Figure 6:
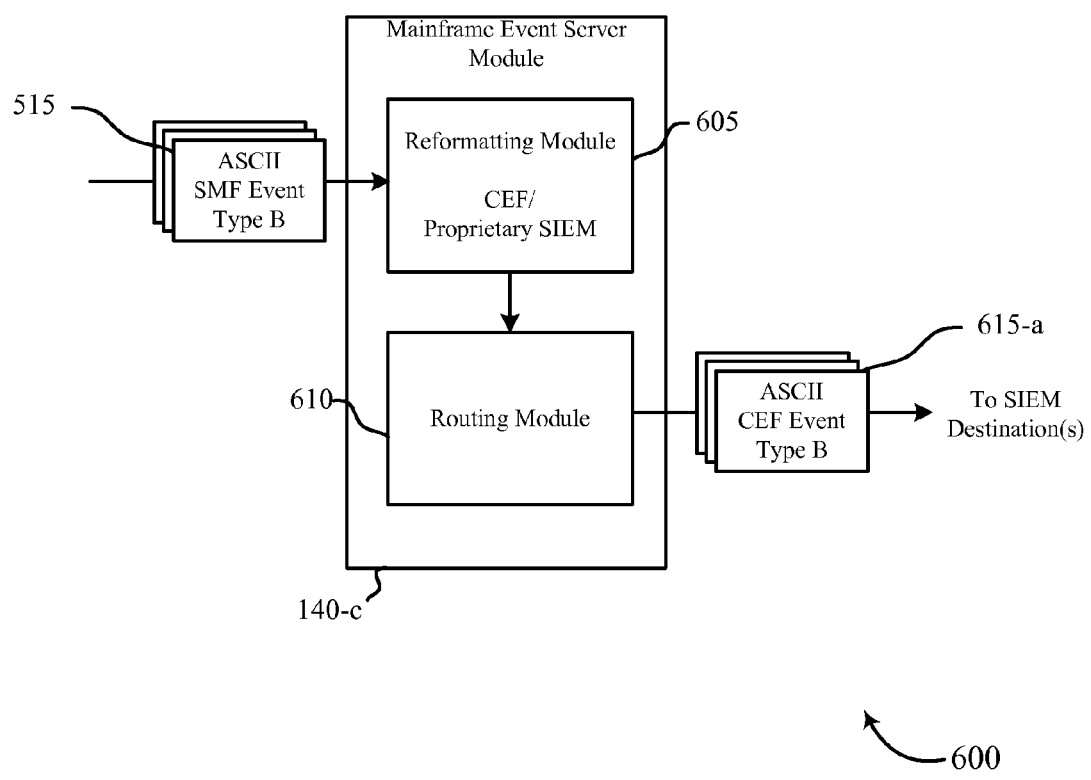
FIG. 6 is a block diagram of an example reformatting and routing module including components configured according to various embodiments of the invention.

FIG. 6 is a functional block diagram 600 illustrating one example of a mainframe event server module 140-c associated with a mainframe (e.g., mainframe 105 of FIG. 1 or FIG. 2) in the context of the example of FIG. 5. The mainframe event server module 140-c may be an example of the mainframe event server module 140 of FIG. 1, FIG. 2, or FIG. 3. The mainframe event server module 140 may be integrated into the mainframe, or portions of the functionality may be located on a server computer system off of a mainframe (e.g., server computer system 145 of FIG. 1 or FIG. 2). In certain examples, the functionality of the mainframe event server module 140-c may be implemented on a Java virtual machine or equivalent trans-platform virtual machine. Additionally or alternatively, some or all of the functionality of the mainframe event server module 140-c may be implemented using a different programming language, such as Python or C.

Continuing the example of FIG. 5, the mainframe event server module 140-c may receive a number of ASCII SMF events 515 of the second type from the re-encoding module 135-b of the mainframe. These events 515 may be reformatted to a generic common event format (CEF) or another open format, at a reformatting module 605 associated with the mainframe event server module 140-c. The routing module 610 may then output the ASCII CEF events 615 to one or more selected destination SIEM applications. The destination SIEM applications may be running on the mainframe and/or on a server associated with the mainframe.

Where multiple SIEM applications are running, the routing module 610 may select an appropriate destination SIEM based on a set of rules. The set of rules may include rules based on the content of the events, rules based on the type of events, rules based on time-of-day, rules based on administrator preferences, and/or any other type of rule that may suit a particular application of the principles described herein. Multiple copies of the same event 615 may be forwarded to separate destination SIEM applications.

In certain examples, the events 615 may undergo additional reformatting at the mainframe event server module 140-c to format the events 615 according to a format of the selected destination SIEM application(s). Thus, the routing module 610 may route a CEF version of an event 615 to one SIEM application and the same event in a proprietary format to a second SIEM application. In certain examples, routing the events 615 to the destination SIEM application(s) includes writing the events to one or more data stores (e.g., a SQL database or other databases) accessible to the destination SIEM application(s).

Figure 7:
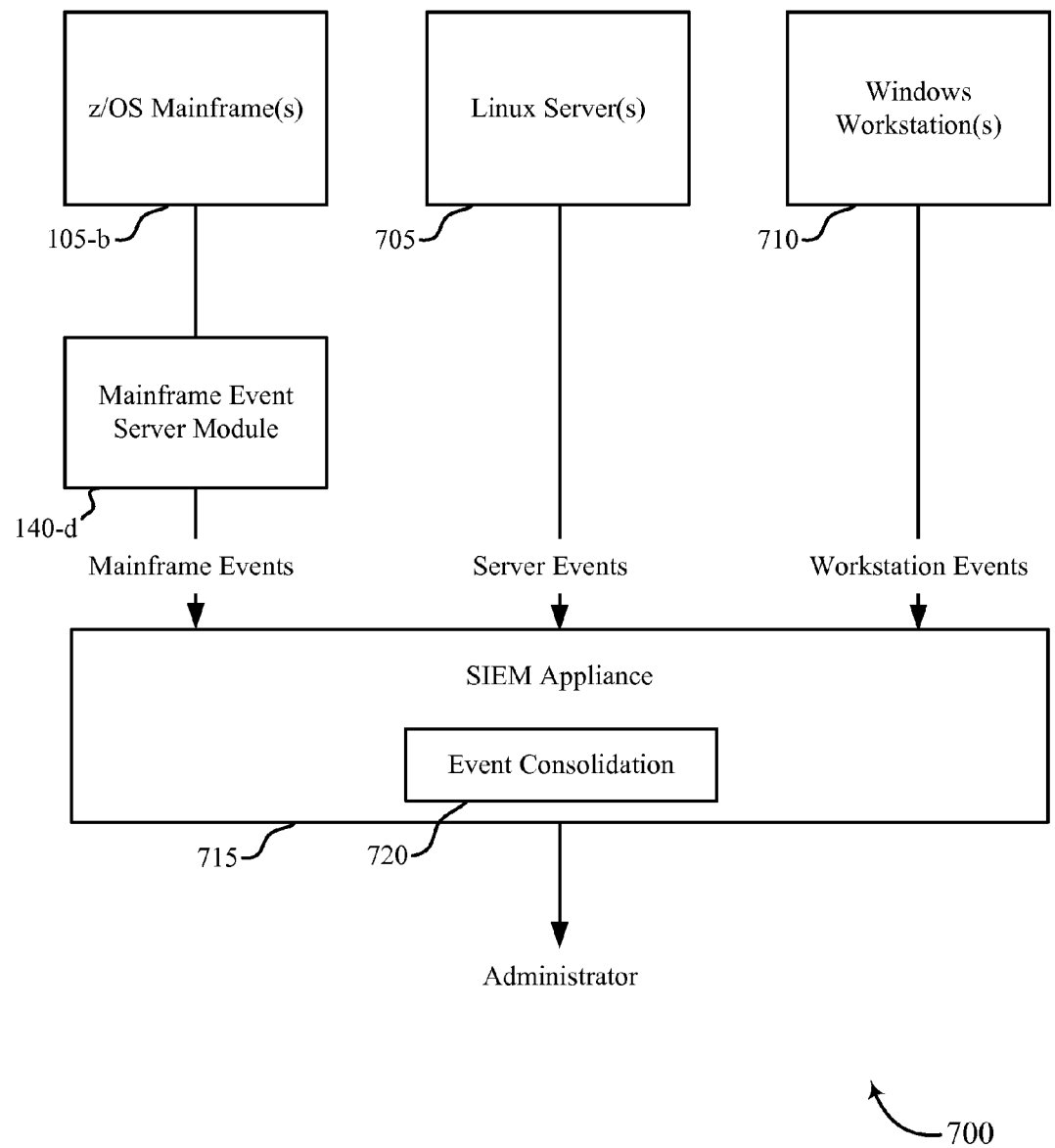
FIG. 7 is a block diagram of an example system including components configured according to various embodiments of the invention.

FIG. 7 is a functional block diagram illustrating one example of a system 700 including one or more z/OS mainframes 105-b, one or more Linux servers 705, and one or more Windows workstations 710. The mainframe(s) may be an example of the mainframe 105 described above with reference to FIG. 1 or FIG. 2. In the present example, the mainframe(s) 105-b, the server(s) 705, and the workstation(s) 710 are each able to output events to a single SIEM appliance 715. The SIEM appliance 715 may include a computing device running one or more SIEM applications. In certain examples, the SIEM appliance may be implemented by one or more of the mainframe(s) 105-b, server(s) 705, or workstation(s) 710.

In past systems, the same SIEM appliance 715 used to view events from servers 705 and workstations 710 may not have been able to also view z/OS mainframe events. However, the mainframe(s) 105-b of the present example may be associated with a filter module (e.g., filter module 130 of FIG. 1, FIG. 2, FIG. 4, or FIG. 5) which monitors the mainframe management console and other sources of data for mainframe events, a re-encoding module (e.g., re-encoding module 135 of FIG. 1, FIG. 2, or FIG. 5), and a mainframe event server module 140-d. Collectively, these modules work together as described above to provide SIEM appliance 715 with access to mainframe events of interest. In this way, the SIEM appliance 715 may consolidate events of interest received from mainframe and non-mainframe sources at a consolidation module 720 and provide a unified view of the events to an administrator or other user.

Furthermore, by incorporating mainframe events into a SIEM appliance 715 that tracks server and workstation events, additional troubleshooting and deductive diagnostic capabilities may be introduced. For example, a set of rules may be applied to a combination of events of different types and from different sources to provide a more adequate view of system health.

Figure 8:
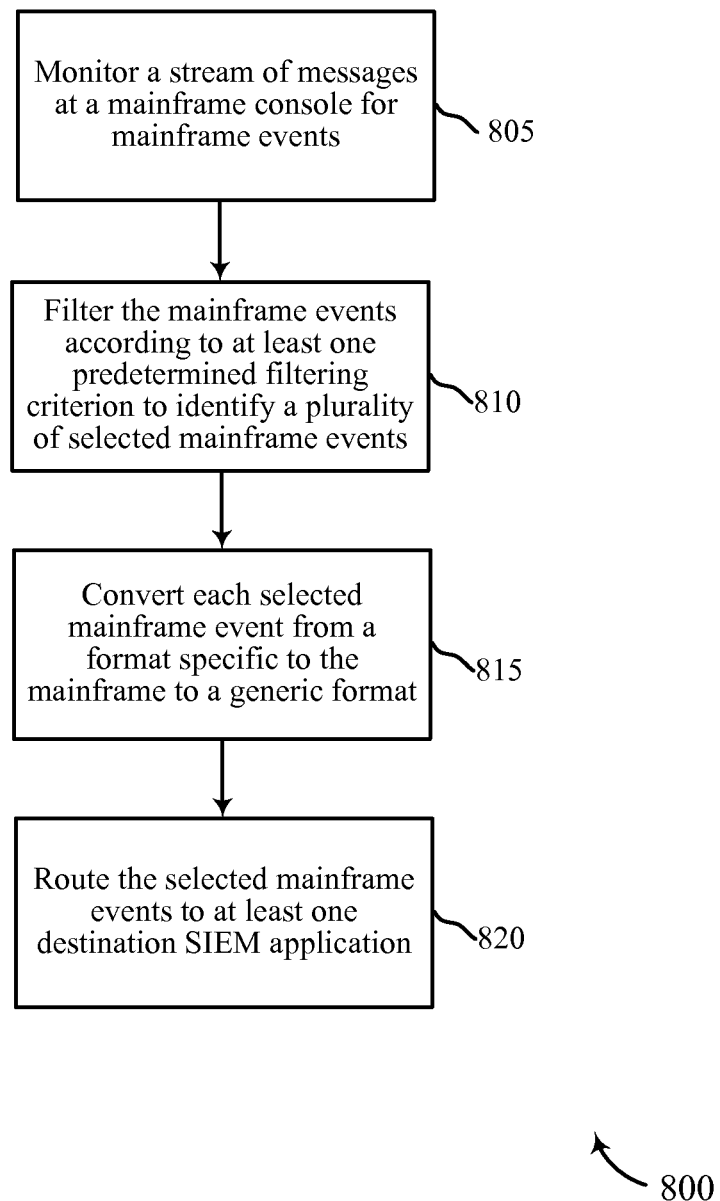
FIG. 8 is a flowchart diagram of an example method of managing mainframe events according to various embodiments of the invention.

Referring next to FIG. 8, a flow chart is shown illustrating an example method 800 for monitoring and managing mainframe events. This method 800 may, for example, be performed in whole or in part by the mainframe 105 of FIG. 1, FIG. 2, or FIG. 7. More specifically, the method 800 may be performed in whole or in part by one or more of: the filter module 130 of FIG. 1, FIG. 2, FIG. 4, or FIG. 5; the re-encoding module 135 of FIG. 1, FIG. 2, or FIG. 5; the mainframe event server module 140 of FIG. 1, FIG. 2, FIG. 3, FIG. 6, or FIG. 7.

At block 805, a stream of messages is monitored at a mainframe management console to detect mainframe events for filtering and selection. The messages may include syslog messages or other messages directed to or from the mainframe management console. The messages may be monitored using a virtual console that mirrors some or all of the messages directed to and from the mainframe management console. Additional mainframe events for filtering and selection may be detected, for example, by monitoring SMF log files and/or periodically generated third-party security application log files (e.g., CA TOP SECRET log files, etc.).

At block 810, the mainframe events detected from the mainframe console messages, the SMF log files, and/or the periodically generated third-party security application log files are filtered according to at least one predetermined filtering criterion to identify a plurality of selected mainframe events. In certain examples, the predetermined filtering criterion is received from an administrator, and can be as generic or as granular as the administrator chooses. The at least one predetermined filtering criterion may be based on, for example, a type of message or record; a type of application; a type of event; message or record content; event content; a time of day, a current location, current security settings, and/or any number of other filtering criteria that may suit a particular application of these principles. In certain examples, the at least one predetermined filtering criterion may by dynamically altered based on a set of predetermined rules or input from the administrator or another user.

At block 815, each selected mainframe event is converted from a character encoding specific to the mainframe to a generic character encoding. In certain examples, the conversion includes converting one or more selected events from Extended Binary Coded Decimal Information Code (EBCDIC) or another mainframe-specific character encoding to American Standard Code for Information Interchange (ASCII) or another generic character encoding. In certain examples, the conversion may further include converting one or more of the selected events to Common Event Format (CEF) or another open event format.

Additionally or alternatively, one or more events may further be converted to a format specific to a destination SIEM application or database to which the events will be routed. At block 820, the selected mainframe events are routed to at least one destination SIEM application. In certain examples, routing the selected mainframe events to the at least one SIEM application includes storing the selected mainframe events at a data store accessible to the at least one destination SIEM application.

Figure 9:
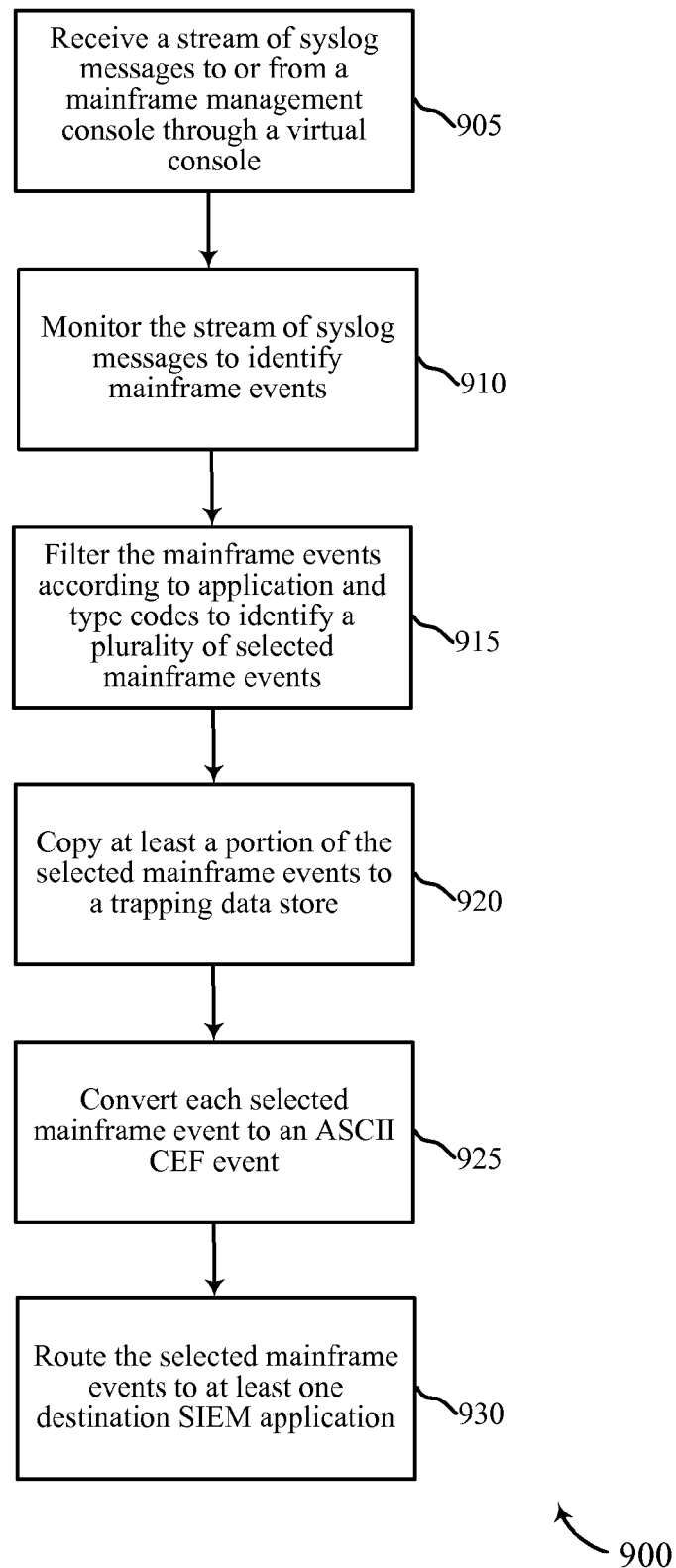
FIG. 9 is a flowchart diagram of an example method of managing mainframe events according to various embodiments of the invention.

Referring next to FIG. 9, a flow chart is shown illustrating another example method 900 for monitoring and managing mainframe events. This method 900 may, for example, be performed in whole or in part by the mainframe 105 of FIG. 1, FIG. 2, or FIG. 7. More specifically, the method 900 may be performed in whole or in part by one or more of: the filter module 130 of FIG. 1, FIG. 2, FIG. 4, or FIG. 5; the re-encoding module 135 of FIG. 1, FIG. 2, or FIG. 5; the mainframe event server module 140 of FIG. 1, FIG. 2, FIG. 3, FIG. 6, or FIG. 7. The method 900 of FIG. 9 may be an example of the method 800 of FIG. 8.

At block 905, a stream of syslog messages coming to or from a mainframe management console is received through a virtual console. At block 910, the stream of syslog messages is monitored to identify mainframe events. In certain examples, an SMF log and/or one or more third-party security application logs may be monitored to identify additional mainframe events. At block 915, the mainframe events are filtered based on application and type codes to identify a plurality of selected mainframe events. At block 920, at least a portion of selected mainframe events is copied to a trapping data store. At block 925, each selected mainframe event is reformatted to convert the selected mainframe event to an ASCII CEF event. At block 930, the selected mainframe events are routed to at least one SIEM application.

Figure 10:
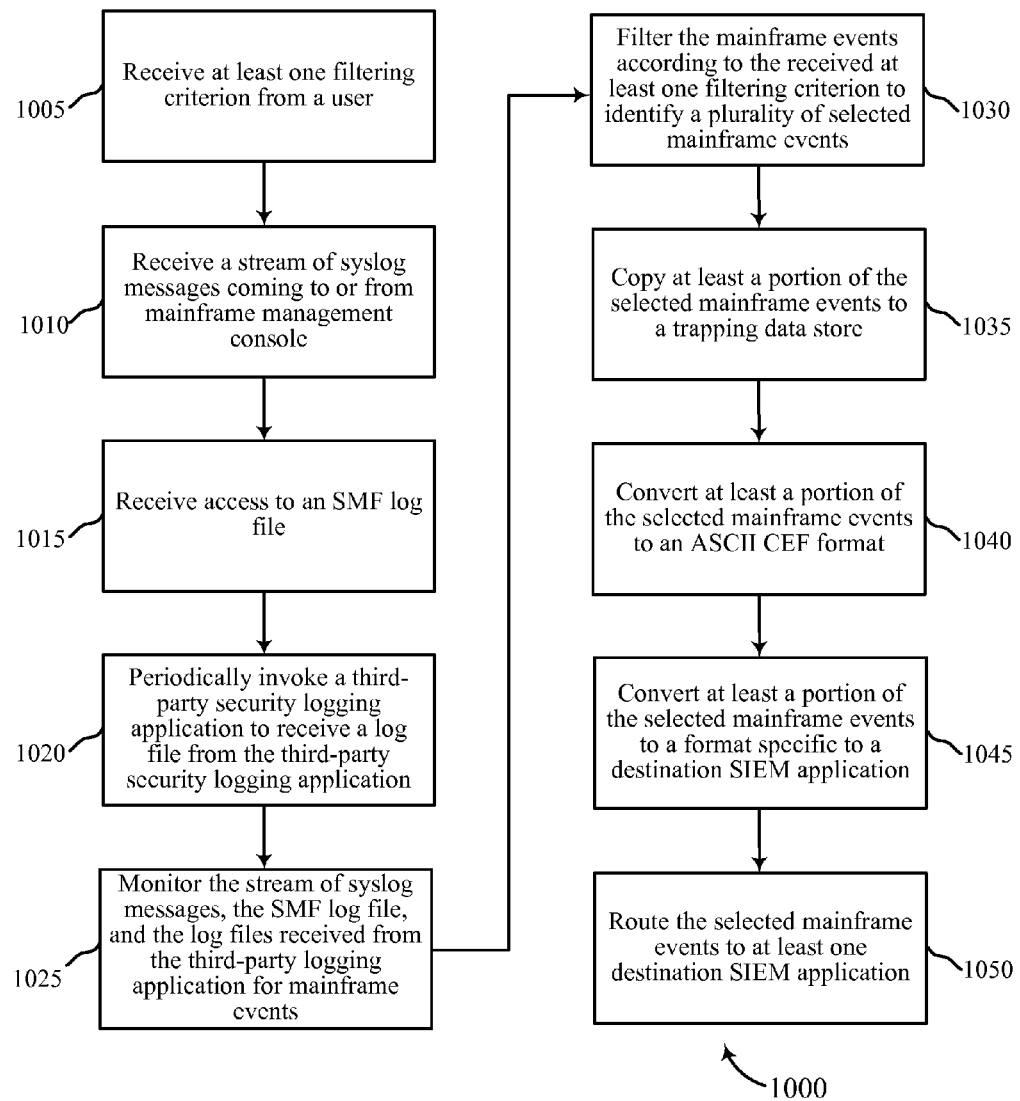
FIG. 10 is a flowchart diagram of an example method of managing mainframe events according to various embodiments of the invention.

Referring next to FIG. 10, a flow chart is shown illustrating another example method 1000 for monitoring and managing mainframe events. This method 1000 may, for example, be performed in whole or in part by the mainframe 105 of FIG. 1, FIG. 2, or FIG. 7. More specifically, the method 1000 may be performed in whole or in part by one or more of: the filter module 130 of FIG. 1, FIG. 2, FIG. 4, or FIG. 5; the re-encoding module 135 of FIG. 1, FIG. 2, or FIG. 5; the mainframe event server module 140 of FIG. 1, FIG. 2, FIG. 3, FIG. 6, or FIG. 7. The method 1000 of FIG. 10 may be an example of the method 800 of FIG. 8 or the method 900 of FIG. 9.

At block 1005, at least one filtering criterion is received from a user. For example, the at least one filtering criterion may include all events that include the string "VTM." At block 1010, a stream of syslog messages coming to or from a mainframe management console are received through a virtual console. At block 1015, access to at least one SMF log file for the mainframe is received. At block 1020, a third-party security logging application is periodically invoked to receive at least one log file from the third-party security logging application. At block 1025, the stream of syslog messages, the at least one SMF log file, and the at least one log file are monitored to detect mainframe events.

At block 1030, the mainframe events are filtered according to the at least one filtering criterion to identify a plurality of selected mainframe events. Thus, continuing with the previous example, the mainframe events are filtered to identify and select the mainframe events that contain the string "VTM." At block 1035, at least a portion of the selected mainframe events are copied to a trapping data store. At block 1040, at least a portion of the selected mainframe events is converted to an ASCII CEF format. At block 1045, at least a portion of the selected mainframe events is converted to a format specific to a destination SIEM application. At block 1050, the selected mainframe events are routed to at least one destination SIEM application.

Figure 11:
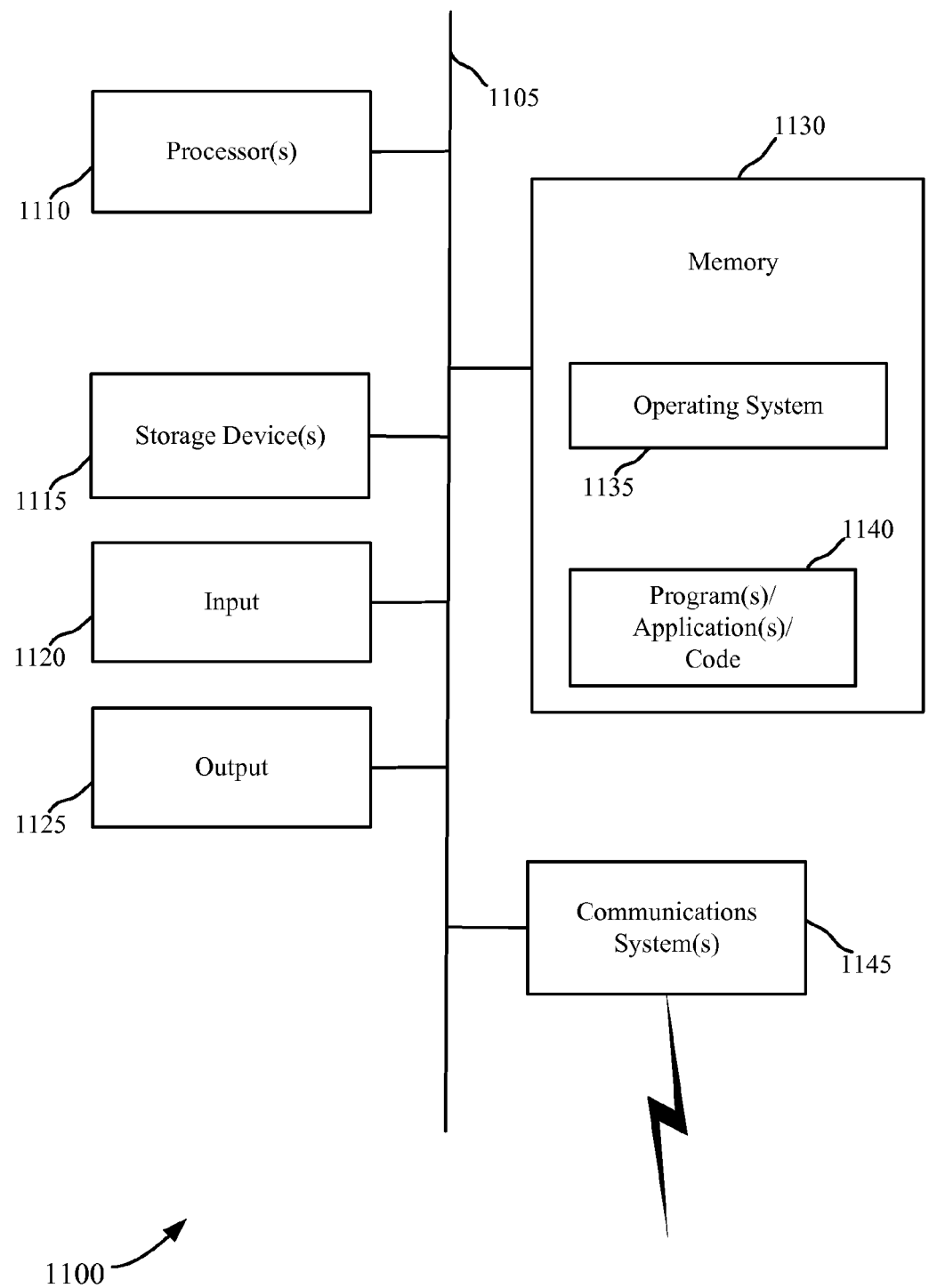
FIG. 11 is a schematic diagram that illustrates a representative payment authority server system that may be used in various embodiments of the present invention.

A device structure 1100 that may be used for a mainframe 105 of FIG. 1, FIG. 2, or FIG. 7; for the mainframe event server module 140 of FIG. 1, FIG. 2, FIG. 3, FIG. 6, or FIG. 7; or for a computer device or SIEM appliance 715 implementing one or more destination SIEM applications, is illustrated with the schematic diagram of FIG. 11. This drawing broadly illustrates how individual system elements of each of the aforementioned devices may be implemented, whether in a separated or more integrated manner. The exemplary structure is shown comprised of hardware elements that are electrically coupled via bus 1105, including processor(s) 1110 (which may further comprise a DSP or special-purpose processor), storage device(s) 1115, input device(s) 1120, and output device(s) 1125. The storage device(s) 1115 may be a machine-readable storage media reader connected to any machine-readable storage medium, the combination comprehensively representing remote, local, fixed, or removable storage devices or storage media for temporarily or more permanently containing computer-readable information. The communications systems interface 1145 may interface to a wired, wireless, or other type of interfacing connection that permits data to be exchanged with other devices. The communications system(s) 1145 may permit data to be exchanged with a network.

The structure 1100 may also include additional software elements, shown as being currently located within working memory 1130, including an operating system 1135 and other code 1140, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for managing mainframe events, comprising:
monitoring a stream of messages at a mainframe management console to detect mainframe events;
monitoring at least one system management facility (SMF) log file associated with the mainframe to detect additional mainframe events;
filtering the mainframe events according to at least one predetermined filtering criterion to identify a plurality of selected mainframe events;
converting each selected mainframe event from a character encoding specific to the mainframe to a generic character encoding; and
routing the selected mainframe events to at least one destination Security Information Event Manager (SIEM) application.

2. The method of claim 1, further comprising:
mirroring messages transmitted through the mainframe management console to a virtual console implemented at the mainframe;
wherein the monitoring the stream of messages at the mainframe management console comprises monitoring the virtual console.

3. The method of claim 1, further comprising:
periodically invoking a logging application executed by the mainframe to generate at least one log file; and
monitoring the at least one log file to detect additional mainframe events for selection based on the at least one predetermined filtering criterion.

4. The method of claim 1, further comprising:
dynamically altering the predetermined filtering criterion based on a set of predetermined rules.

5. The method of claim 1, further comprising:
dynamically altering the predetermined filtering criterion based on input from a user.

6. The method of claim 1, wherein the predetermined filtering criterion comprises at least one of: a specified message type code, a specified application code, or a specified message content.

7. The method of claim 1, wherein:
the character encoding specific to the mainframe comprises Extended Binary Coded Decimal Information Code (EBCDIC) encoding; and
the generic character encoding comprises American Standard Code for Information Interchange (ASCII) encoding.

8. The method of claim 1, wherein the routing the selected mainframe events to the at least one destination SIEM application comprises:
storing the selected mainframe events at a data store accessible to the at least one destination SIEM application.

9. A system for managing mainframe events, the system comprising:

a filter module configured to
monitor a stream of messages at a mainframe management console to detect mainframe events and filter the mainframe events according to at least one predetermined filtering criterion to identify a plurality of selected mainframe events; and
monitor messages in at least one system management facility (SMF) log file associated with the mainframe to detect additional mainframe events for selection based on the at least one predetermined filtering criterion;
a re-encoding module configured to convert each selected mainframe event from a character encoding specific to the mainframe to a generic character encoding; and
a routing module configured to route the selected mainframe events to at least one destination Security Information Manager (SIEM) application.

10. The system of claim 9, further comprising:
a virtual console module configured to mirror messages transmitted through the mainframe management console;
wherein the filter module monitors the stream of messages at the mainframe management console by monitoring the virtual console.

11. The system of claim 9, wherein the filter module is further configured to:
periodically invoke a logging application executed by the mainframe to generate at least one log file; and
monitor the at least one log file to detect additional mainframe events for selection based on the at least one predetermined filtering criterion.

12. The system of claim 9, wherein the filter module is further configured to:
dynamically alter the predetermined filtering criterion based on at least one of: a set of predetermined rules or input from an administrator.

13. The system of claim 9, wherein the routing module is further configured to:
store the selected mainframe events at a data store accessible to the at least one destination SIEM application.

14. A system for managing mainframe events, the system comprising:
at least one processor;
at least one memory communicatively coupled with the at least one processor, the at least one memory comprising executable code that, when executed by the at least one processor, causes the at least one processor to:
monitor a stream of messages at a mainframe management console to detect mainframe events;
continuously monitor messages in at least one system management facility (SMF) log file associated with the mainframe to detect additional mainframe events for selection;
filter the mainframe events according to at least one predetermined filtering criterion to identify a plurality of selected mainframe events;
convert each selected mainframe event from a character encoding specific to the mainframe to a generic character encoding; and
route the selected mainframe events to at least one destination Security Information Manager (SIEM) application.

15. The system of claim 14, wherein the executable code further causes the at least one processor to:
mirror messages transmitted through the mainframe management console to a virtual console;

wherein the at least one processor monitors the stream of messages at the mainframe management console by monitoring the virtual console.

16. The system of claim 14, wherein the executable code further causes the at least one processor to:
   periodically invoke a logging application executed by the mainframe to generate at least one log file; and
   monitor the at least one log file to detect additional mainframe events for selection based on the at least one predetermined filtering criterion.

17. The system of claim 14, wherein the predetermined filtering criterion comprises at least one of: a specified message type code, a specified application code, or a specified message content.

\* \* \* \* \*